Jan. 16, 1945.    R. A. ROAD    2,367,433
PLASTIC WATT-HOUR METER BASE
Filed July 8, 1941    4 Sheets-Sheet 1
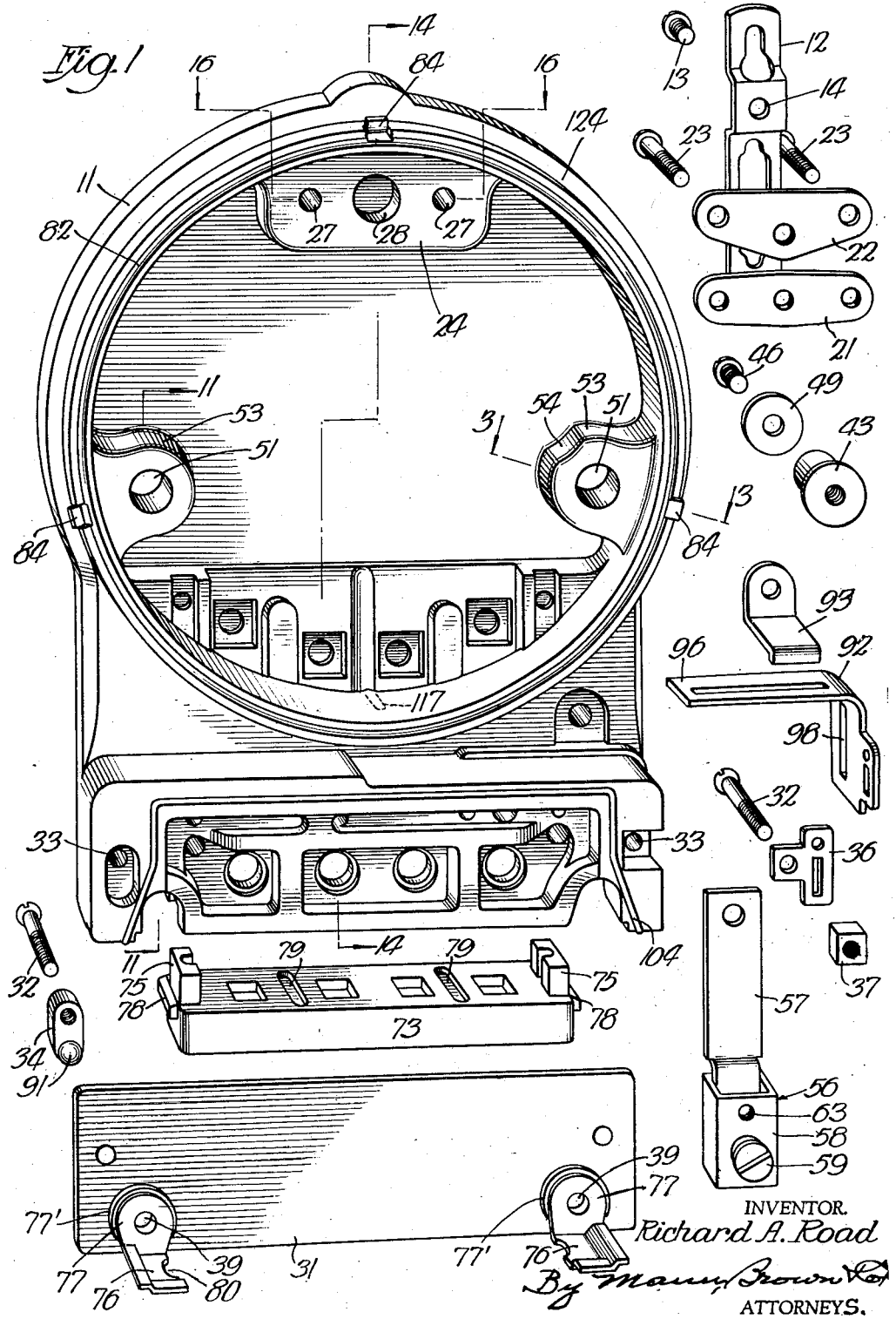

Jan. 16, 1945.  R. A. ROAD  2,367,433
PLASTIC WATT-HOUR METER BASE
Filed July 8, 1941  4 Sheets-Sheet 2
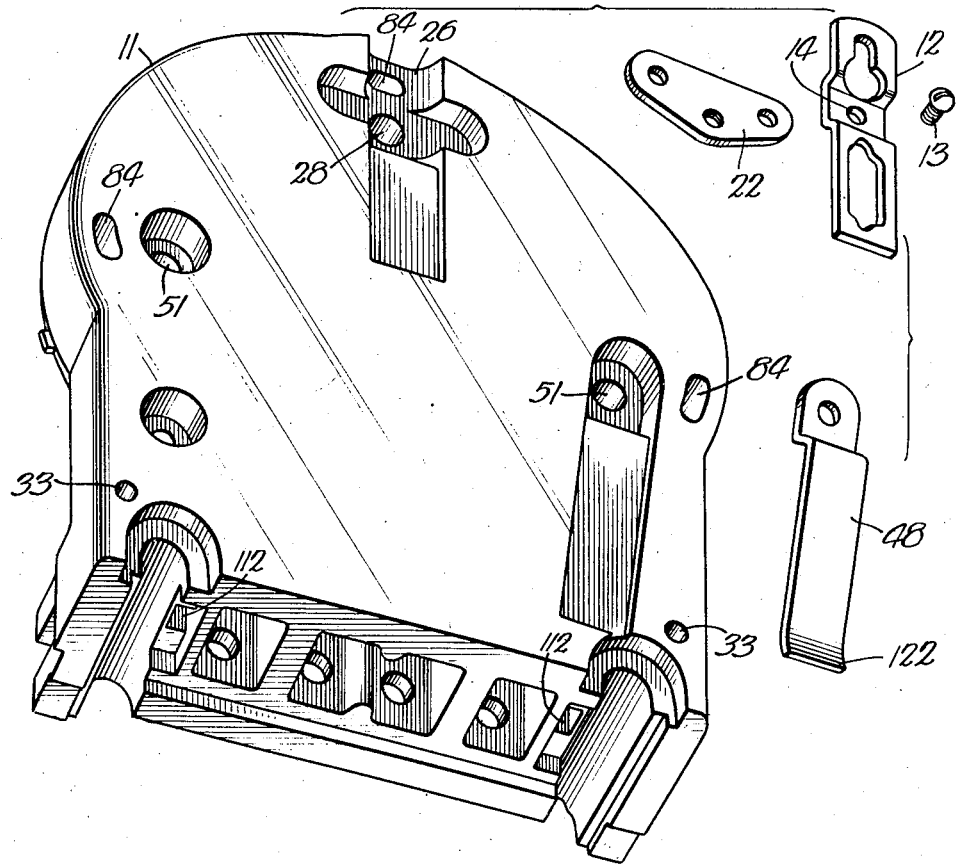
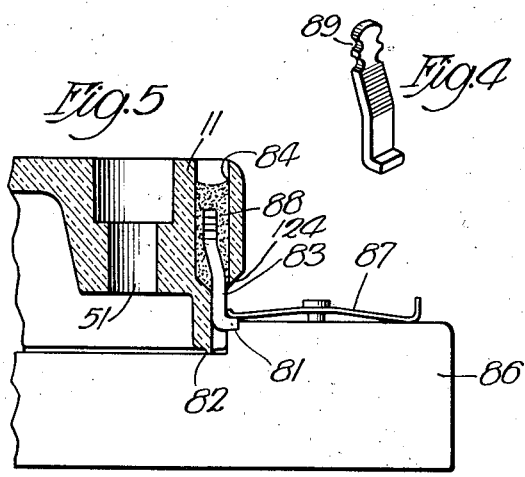
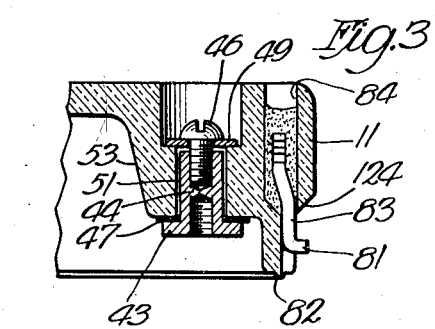
INVENTOR.
Richard A. Road
BY
ATTORNEYS.

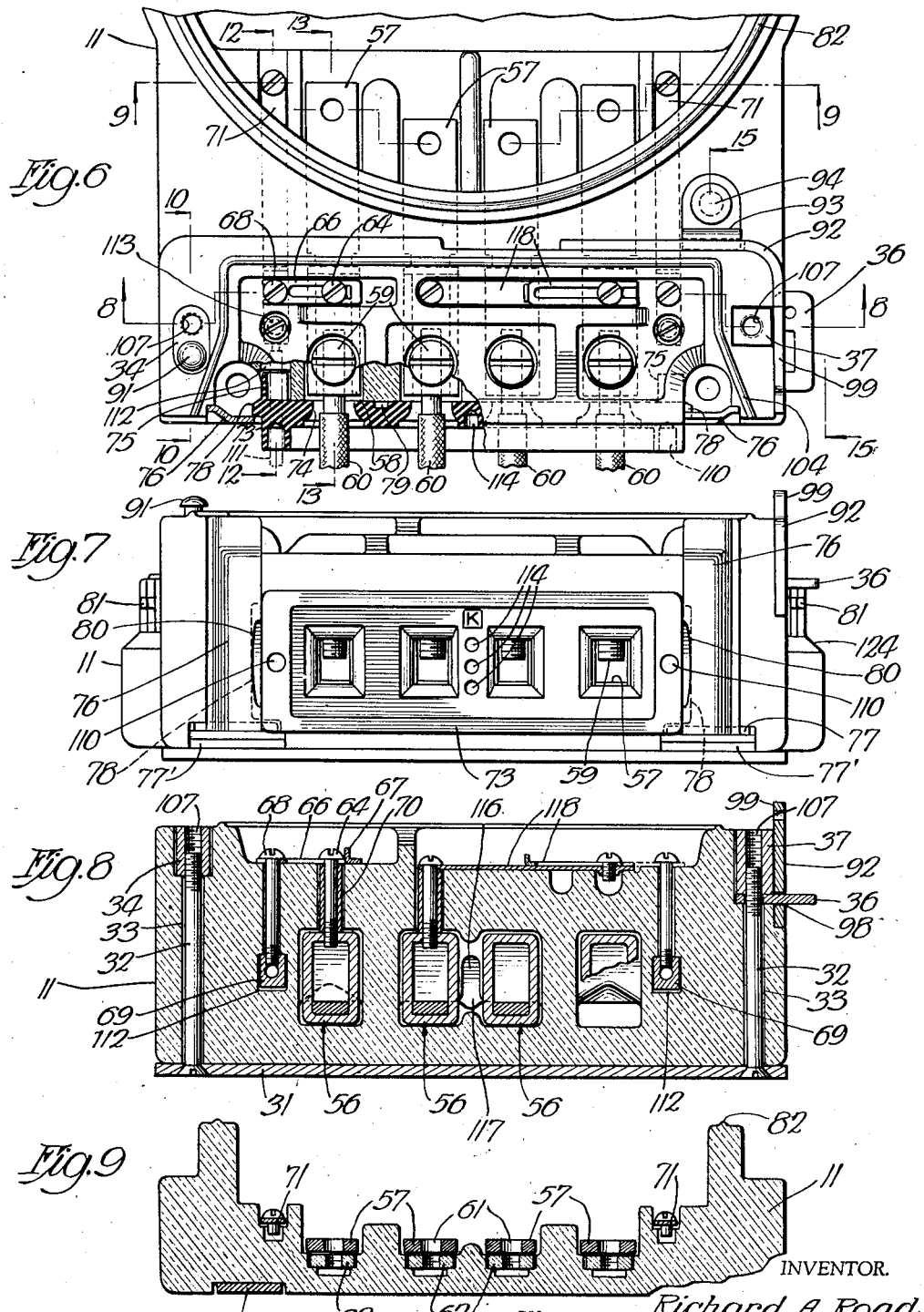

Jan. 16, 1945.  R. A. ROAD  2,367,433
PLASTIC WATT-HOUR METER BASE
Filed July 8, 1941  4 Sheets-Sheet 4
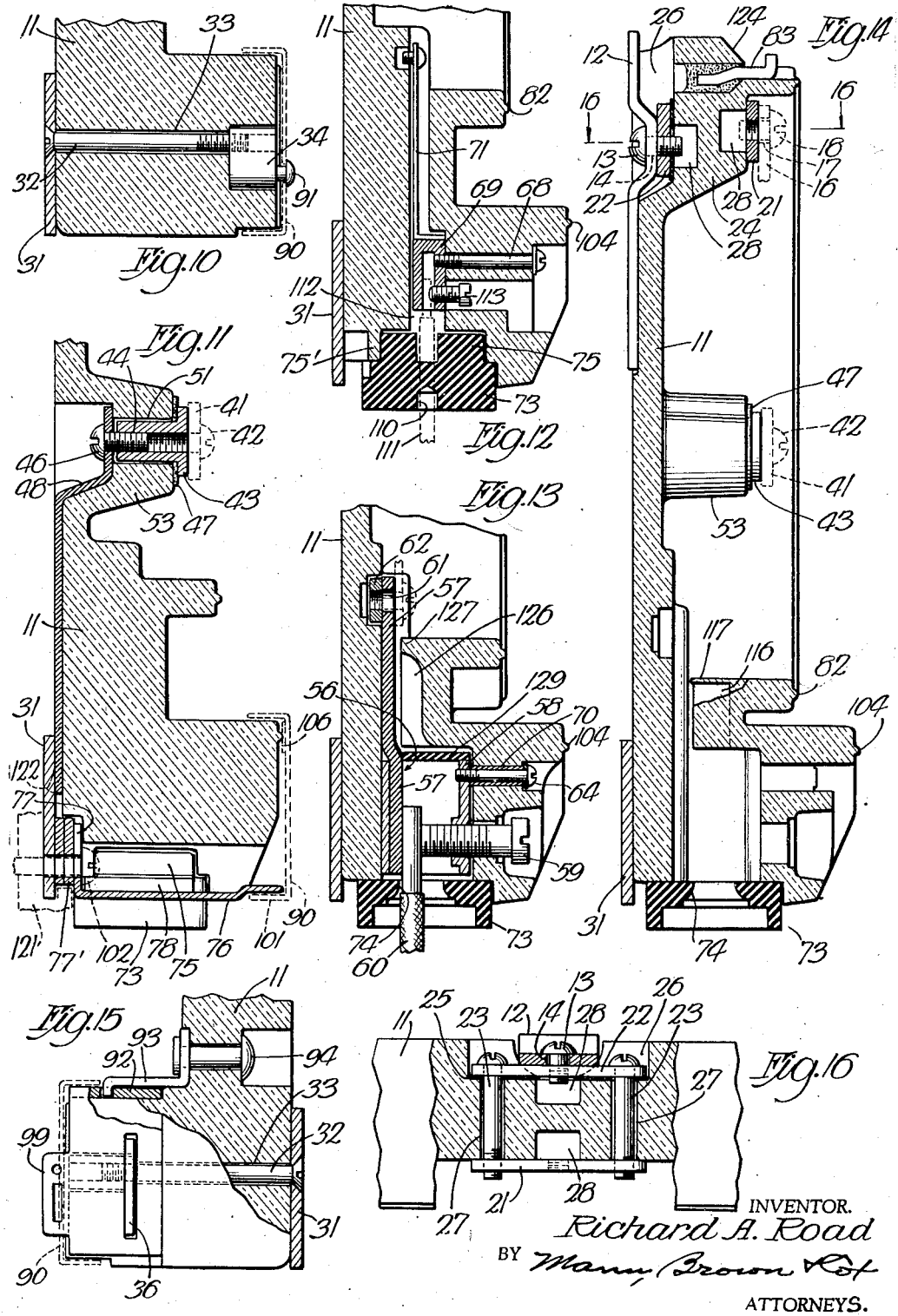

Patented Jan. 16, 1945

2,367,433

UNITED STATES PATENT OFFICE 2,367,433

PLASTIC WATT-HOUR METER BASE

Richard A. Road, La Fayette, Ind., assignor to Duncan Electric Manufacturing Company, La Fayette, Ind., a corporation of Illinois Application July 8, 1941, Serial No. 401,444

13 Claims. (Cl. 171—34)

In bases for watt-hour meters there are a number of features that are extremely desirable. They should fit standard covers and connecting facilities since interchangeability is important commercially. The cover should seal tightly against the base so that dust and water cannot enter the meter chamber. Preferably, it should be very difficult to drill a hole through the base, particularly into the meter chamber, through which a wire may be inserted or particles may be blown. An electrical connection should be provided for automatically grounding the meter element to the connecting box (metal wire housing) if a connecting box is provided. The base should be highly weather-resistant since many of the bases will be exposed to salty atmosphere near the ocean. The various standard connections must be possible and, in fact, the connecting facilities should preferably be standard. Lightness in weight is desirable to reduce shipping costs. It is highly desirable that the terminals to which the wires are connected be insulated from one another with a "non-tracking" insulating material. With some insulating materials, such as "Bakelite," there is danger that under abnormal circumstances a conductive path or track will be formed on the surface of the insulating material, and if this happens a current flowing along the track will increase the conductivity of the track and more and more current will pass until there may even be an explosion.

A base similar to that illustrated in Holmes Patent No. 2,046,307 has seen extensive use and is the most satisfactory which has been provided heretofore. It is especially satisfactory when a porcelain terminal block, already available, is used therein. This Holmes base was made of cast aluminum. In view of the present abnormal demand for aluminum, it is desirable to provide a base which is not made of aluminum but which has the above mentioned qualities nevertheless.

According to the present invention, a porcelain meter base with a terminal combined therewith has been provided. This base has nearly all the advantages of the Holmes aluminum base except that it is a little heavier. It is not nearly as heavy as a cast iron or steel base would be. In addition, it has other advantages, such as the fact that it is largely made up of a non-trackable insulating material which makes it safer than previous meter bases and permits the integral incorporation of the terminal block therein. It also is extremely hard to drill. A number of detailed problems had to be solved to provide this base, but they have all been solved satisfactorily. Although a major object of the invention was to provide a satisfactory base not made of aluminum or like metal, an additional object was to solve the various specific problems involved in the provision of a porcelain base.

Further objects and advantages of the invention will be apparent from the following description and from the drawings, in which:

Fig. 1 is an exploded perspective view showing the main porcelain body portion and separated therefrom most of the parts which are applied to this body portion to complete the base.

Fig. 2 is a similar view showing the rear and bottom of the body portion together with some of the parts removed from the back thereof.

Fig. 3 is a fragmentary cross sectional view taken approximately on the line 3—3 of Fig. 1.

Fig. 4 is a perspective view of the cover-securing insert shown cemented to the base in Fig. 3.

Fig. 5 is a somewhat diagrammatic view illustrating the manner of obtaining accurate positioning of the insert with respect to the body portion of the base as the insert is cemented thereto.

Fig. 6 is a fragmentary face view of the portion of the base which forms the terminal block showing wires connected thereto.

Fig. 7 is a bottom view of the base.

Fig. 8 is a generally horizontal sectional view taken approximately on the irregular line 8—8 of Fig. 6.

Fig. 9 is a similar view taken approximately on the irregular line 9—9 of Fig. 6.

Fig. 10 is a fragmentary vertical sectional view taken approximately on the line 10—10 of Fig. 6.

Fig. 11 is a generally vertical sectional view taken approximately on the line 11—11 of Fig. 1.

Figs. 12 and 13 are generally vertical sectional views taken approximately on the lines 12—12 and 13—13, respectively, of Fig. 6.

Fig. 14 is a generally vertical sectional view taken approximately on the irregular line 14—14 of Fig. 1, broken away to show the break-out wall 117.

Fig. 15 is a fragmentary partly sectional view taken approximately on the irregular line 15—15 of Fig. 6.

Fig. 16 is a fragmentary partly sectional view taken approximately on the irregular line 16—16 of Fig. 1.

A preferred form of the invention has been chosen for illustration and description, in compliance with section 4888 of the Revised Statutes, but persons skilled in the art will readily perceive other means for accomplishing the same results, and the claims are therefore to be construed as broadly as possible, consistent with the prior art.

The body portion 11 of this form of the invention is seen best in Fig. 1. This body portion is preferably porcelain molded in one piece. A dry process porcelain is preferred for reasons of economy and because there is less shrinkage than with the wet process. Any type of porcelain which can be suitably molded and which will not deteriorate by exposure to weather even under the most adverse conditions, such as alternate rain and freeze, may be used. A typical formula would be: feldspar 36%, potter's flint 24%, Tennessee ball clay 20%, Georgia kaolin 10%, Florida kaolin 8%, and talc 2%. Composition of such porcelain body may be varied by substitutions and additions of such material as pyrophyllite, dolomite and, to produce a gray body, not over 6% of iron chromate. The materials are preferably air-floated.

This body portion may be made of other plastics, such as glass or the non-ceramic plastics of which "Bakelite" is an example. Glass is difficult, if not impossible, to mold in the complicated shape shown, however, and the ceramic plastics are preferred to the non-ceramic plastics now available because those which are considered otherwise suitable are subject to "tracking"—the formation of a surface conductive path thereon which progressively increases in conductivity. It should be noted, however, that, although porcelain is preferred, most of the detailed features of the invention would be as applicable to other plastics, if they were chosen for use, as to procelain.

It is believed that the porcelain body portion can best be described with relation to the various parts that are attached thereto.

*Mounting features*

It is desirable to provide the base with standard mounting facilities. For this purpose it is desired to provide a keyhole hanger 12 on the back of the meter near its top, this hanger being reversible to put either end up according to the wishes of the particular power supply company installing the meter. To obtain this reversibility in the most desirable and standard form it is necessary to secure the hanger 12 to the base of the meter by a screw 13 passing through hole 14 in the hanger which must be at the exact position shown best in Fig. 14. It so happens, however, that the standard meter measuring element for which this base is designed is secured to the base by three mounting lugs of which one is the upper lug 16, shown in Fig. 14. Space requirements necessitate the positioning of this mounting lug 16 as shown in Fig. 14, and it will be noted that the hole 17 through this mounting lug is out of alinement with the hole 14 in the hanger 12.

It will be understood that the various screws cannot be threaded into the porcelain since the porcelain threads would chip off and would not hold the screws reliably and are difficult and expensive to form. Accordingly, metal portions must be provided for the screw 13 and the measuring element mounting screw 18 and, as previously noted, the two metal portions must in this case have their tapped holes slightly out of alinement.

It is believed that in this instance the misalined tapped holes are best provided by the two plates 21 and 22, seen best in Figs. 1, 14 and 16. These plates 21 and 22 are both drawn tight onto the body portion 11 by means of screws 23 which are passed from the back of the base through plate 22 and screwed into plate 21. A yielding sealing gasket 25 could be used under plate 22, the material known as "Velutex" being at present preferred.

The base 11 is provided with a suitable thickened portion 24 for properly positioning the plate 21 and a suitable recess 26 for receiving the plate 22 and the hanger 12. It is also provided with passages 27 for receiving screws 23 and with recesses 28 for receiving screws 13 and 18.

In order that the base may be mounted on a slightly uneven wall without placing excessive strain on the porcelain body portion, the hanger 12 is arranged to project slightly rearwardly from the body portion 11 so as to hold the body portion slightly spaced from the wall. It is likewise desirable that the lower end of the porcelain body portion be held slightly spaced from the wall, and for this reason the mounting means at the bottom of the body portion, namely the plate 31, is also arranged to project rearwardly beyond the body portion. As a matter of fact, it has been shown as being positioned entirely behind a flush surface of the body portion, this being done because a flat surface is preferred in order to facilitate supporting the entire body portion while it is being fired. If a recess were provided for the plate 31 and the lower end not supported, the lower end might sag and cause excessive irregularities of shape. The plate 31 should be of a thickness corresponding to the projection of hanger 12 behind body portion 11, preferably about $\frac{1}{8}$ inch, so as to support the body portion 11 in vertical position. The interal parts will, of course, be dimensional to hold the measuring element in proper position relative to the body portion 11.

The bottom mounting plate 31 is best seen in Figs. 1, 10 and 15. This plate is secured against the back of the body portion 11 by means of two screws 32. As indicated in Fig. 1 and as seen in Fig. 10, one of the screws 32 passes through the plate 31, then through a hole 33 in the procelain, and screws into a metal block 34, having a second purpose described under the heading "Terminal chamber cover." The other screw 32, as indicated in Fig. 1 and as seen in Fig. 15, passes through the plate 31, then through another hole 33 in the porcelain, through a sealing plate 36, and threads into a metal block 37. The plate 31 is also provided with holes 39 through which mounting screws for the base may be passed to screw into the wall against which the base is mounted.

The measuring element is provided with one mounting lug 41, shown in dotted lines in Fig. 14, on each side thereof. Each of these lugs is secured by a screw 42 which passes through the lug and is threaded into a bushing 43. As seen best in Fig. 11, each bushing 43 is provided with an elongated portion 44 threaded at both ends, into one of which a screw 46 is threaded to draw the bushing 43 tight against the body portion 11 or, more specifically, against a yielding sealing gasket 47. It will be observed that both the screws 42 and 46 can screw into opposite ends of a single tapped bore of portion 44, as shown in Fig. 11. However, the construction shown in Fig. 3 is preferred, the solid center portion of the bushing positively preventing the seepage of moisture along the threads. In Fig. 11, the head of screw 46 bears on grounding strap 48 which is described under the heading "Grounding connection." As indicated in Figs. 1 and 3, the head of screw 46 at the other side of the meter bears against a washer 49.

*Accurate positioning of parts*

Since porcelain is not fired in the mold, there are minute variations between successive body portions molded from the same mold, these variations resulting from differences in shrinkage or the like. It is very desirable, however, that the members for mounting the measuring element be accurately and uniformly positioned with respect to one another. This is preferably accomplished by providing oversized holes 51 for the bushings 48 so that these bushings may be positioned with respect to the plate 21 by a jig while they are being tightened. It may be observed, incidentally, that all of the recesses in and passages through the porcelain are preferably oversize to avoid trouble due to irregularities. In this connection it may also be pointed out that one of the thickened portions 53 through which the bushings 48 extend has been shown as of irregular shape or notched at 54. This is to provide room for a portion of the particular meter element for which the illustrated form of the base was primarily designed.

*Terminal features*

The terminal units 56 and their connections may be exactly the same as those heretofore standardized by the major meter manufacturers. Each terminal unit includes a terminal strap 57 and a tubular terminal clamp 58 having a binding screw 59 threaded into the front side thereof. As best seen in Fig. 13, the screw 59 clamps a wire 60 of the circuit being measured, into firm contact with the terminal strap 57. This strap extends upwardly through the lower portion of the base into the meter chamber where it is provided with a hole 61 for the attachment of a wire leading to the current coil of the measuring element. The hole 61 may be tapped or, more economically, a nut 62 may be positioned in a square recess in the porcelain body portion behind the hole 61 so that the binding screw will screw into the nut and clamp the wire against the upper end of the terminal strap 57.

The terminal clamp 58 is also provided with a tapped hole 63 into which a screw 64 may be screwed if desired.

As seen best in Fig. 8, the screw 64 which may also be called a binding screw, bears against a link 66 which is shiftable by handle 67 to be under an additional screw 68 or to be spaced therefrom as desired. The screw 68 threads into a potential member 69 to which a potential terminal strap 71 (Figs. 6 and 12) is fastened. A spacer 70 is provided on screw 64 so that the associated terminal unit will have a little play to facilitate alinement of the terminal unit with relatively inflexible connections, but such play is not necessary for the parts associated with screw 68.

A meter will ordinarily be provided with two terminal units comprising the straps 71 and terminal member 69. It will also ordinarily be provided with four of the main terminal units 56, although, as seen in Fig. 6, two of them will be longer than the other two.

The terminal units are inserted by removing the screws therefrom, slipping them up into the body portion, and inserting the screws through appropriate holes in the front of the body portion. These screws, once screwed into the terminal clamp hold the terminal clamp in place.

It is not desirable to have the bottoms of the terminal units exposed, as this might result in accidental shocks and might invite tampering. According to the present invention, the terminal units are shielded from the bottom by a guard plate 73 formed of suitable insulating material. Porcelain could be used for this, but accurate measurements are desirable and furthermore the plate is relatively thin and long so that, if made of a material as brittle as porcelain, there might be excessive breakage. At the present time, therefore, a non-ceramic plastic, such as that known commercially as "Bakelite," is preferred.

Because of the fact that "Bakelite" is a trackable material, special precautions are taken to minimize and substantially eliminate the danger of tracking from its use in this instance. The length of the terminal units below the screw 59 is such that, when the screw 59 comes to rest on the porcelain surrounding it, the terminal unit 56 cannot touch the "Bakelite" guard plate 73, being preferably spaced about $\frac{1}{16}$" thereabove. With even a very small air gap between the terminal unit 56 and the "Bakelite," the danger of tracking along the "Bakelite" between terminal units is eliminated. The holes for screws 59 need be only slightly larger in diameter, say .005 inch, than the screws, since no great allowance for variations is necessary at this point. Tracking along the "Bakelite" between the service wires 60 is theoretically possible. According to the present invention, however, the danger thereof is minimized (as are also the chances of putting excessive strain on the "Bakelite") by designing the cover plate 73 so that with the intended positions of the parts, the edges 74 of the holes through which the service wires 60 are inserted will always be offset outwardly with respect to the wire-engaging portions of the terminal unit. Thus, as seen in Fig. 13, the rear edge 74 of the wire-receiving aperture is displaced rearwardly of the plate coinciding with the front face of terminal strap 57. If the wire lies flat against this face and goes straight down from it, it will still be spaced from the guard plate 73. If the wire is not straight, it will usually be bent forwardly, and it will be observed that there is much more room between the wire and the forward edge of the aperture, i. e. the forward edge is spaced substantially forwardly of the normal position of the end of binding screw 59. As seen from Fig. 6, the side edges 74 of the wire-receiving aperture are spaced apart more widely than the inside opening of terminal clamp 58, and each is set back from the inside plane thereof. The guard plate 73 is designed to have a slight clearance (Fig. 11) with the porcelain all around and may be provided with lugs 75 fitting beside specially provided lugs 75' (Fig. 12) on the body portion, both of which are so disposed that the guard plate can only be applied in one position if right side up. Lugs 75' can be omitted in the interests of simplification or if the guard plate 73 is symmetrical so that its position is immaterial. The lugs 75 also decrease the likelihood of tracking as do the grooves 79, by increasing the surface distances between conductors, according to principles taught in Patent 2,154,411 issued jointly to Stanley S. Green and me. In the case of lug 75 the surface distance increased is that along the top of the plate 73 between voltage wires 111 and brackets 76 which are the preferred means for holding the guard plate 73 in place. The surface creepage or tracking distance along the bottom of guard plate 73 from wire 111 to bracket 76 is preferably increased, not only by the downwardly extending skirt in which holes 110 are formed, but also by shaping bracket 76 with a cutaway shape at 80 in the vicinity of wire 111.

Brackets 76 are secured to mounting plate 31 by lateral flanges 77 on brackets 76 welded to washers 77' which are welded to the mounting plate 31. All of these parts may be spot welded together simultaneously. These brackets 76 may engage flanges 78 formed integrally on the ends of the guard plate 73. The brackets 76 are preferably somewhat curved or angular in cross section so as to increase their rigidity and so as to conform in shape to standardization requirements.

Washers 77' are provided, and are flattened on their undersides, so as not to interrupt channel 80' into which lip 81' of the connecting box may extend as seen in Fig. 11. It is desirable that the connecting box be externally overlapped from above wherever there is no other sealing, to prevent water from running into the connecting box.

Meter cover

It is highly desirable that the meter base be adapted to have standard covers mounted thereon so that these covers may be interchangeable between the new base and old bases. Heretofore these covers have been secured by three bayonet clamps which, upon slightly turning the cover, slide under lugs formed on the base in the position of the lug 81 shown in Fig. 3. By turning the cover, the resilient bayonet arm of the clamp draws the cover tight against a sealing rib such as the rib 82 in Fig. 3. This arrangement is disclosed in the Holmes Patent No. 2,046,307 mentioned heretofore. A porcelain lug in place of the lug 81 would not have adequate strength for securing the cover. According to the present invention, therefore, the lug 81 is formed as part of a metal insert or slug 83 cemented in a recess or passage 84 in the body portion 11. Since the covers require three of the lugs 81, one of the inserts 83 is thus cemented in each of the three recesses 84 seen in Fig. 1.

In order for the bayonet clamp to act properly, it is necessary for the lugs 81 to be positioned accurately with respect to the sealing rib 82, a tolerance of only .005 inch in either direction being permissible according to one manufacturer's standards. To provide this accuracy, the sealing rib 82 is first ground to a plane. It should be noted, incidentally, that the provision of the narrow sealing rib 82 not only aids in having a high contact sealing pressure with the cover gasket but also greatly reduces the cost of grinding the sealing surface to flatness, since the slight amounts necessary to be ground from the narrow sealing rib 82 may be ground off quite inexpensively. The grinding of the sealing rib is considered necessary, first because the finished porcelain is not always uniform, and second because a fiber gasket is preferred to a rubber gasket since a rubber gasket might stick or more or less vulcanize itself to the cover and to the rib and prevent twisting the cover to loosen the bayonet clamps.

After grinding the sealing rib 82 to a plane, the three inserts 83 are secured to a jig represented more or less diagrammatically by 86, and the body portion 11 is slipped over them so that each insert 83 extends into the recess 84, as seen in Fig. 5. The insert 83 may be held to the jig in any suitable manner, as by a movable spring clip 87. It will be observed that the body portion 11 rests with its rib 82 on the jig while the lug 81 also rests directly on the jig. Thus, these two members are positioned with respect to each other with extreme accuracy. Any suitable cement 88 is now poured into the recess 84, and the parts are left on the jig until the cement has hardened sufficiently to make removal of the body portion 11 with the inserts 83 therein safe. The cement 88 may be any suitable ceramic cement, preferably of low shrinkage characteristics. Of course, it must be waterproof. Litharge and glycerin cement or Portland cement are also possibilities. A type metal may also be considered as a suitable cement, since it has the desirable characteristic of expanding on cooling so that it is sure to hold the insert 83 firmly.

The described method of mounting the inserts 83 in the base has the additional advantage that it places the inserts properly with respect to one another so that they define a circle of predetermined diameter appropriate for proper cooperation with the cover. In other words, the fact that the base may have shrunk will not cause these lugs to be so improperly positioned that there will be objectionable lateral play of the cover.

The insert 83 may be made of any suitable strong metal, the strongest and most non-corrosive consistent with price considerations being preferred. Among others, both the silicon bronze known as "Everdur" and red brass are suitable. The insert 83 is preferably shaped so as to facilitate the flow of the cement around it while at the same time presenting an irregular shape which increases the safety with which it is anchored. It may not only be irregular longitudinally but it may be provided with the notches 89, seen best in Fig. 4.

Terminal chamber cover

The region in which the terminal clamps 58 are located has heretofore been called the terminal chamber, and for convenience this term may still be used. Since a separate terminal block has been provided heretofore, the base has in past been formed with this whole zone vacant to leave room for the terminal block. According to the present invention, however, it is understood that the insulating portions of the terminal block are an integral part of the body portion. It is nevertheless necessary to provide a metal cover 90 for the terminal chamber to prevent accidental shocks or tampering on the part of unauthorized persons. For the sake of interchangeability, it is again desirable that standard terminal chamber covers fit the new base. To this end the securing formations for the standard terminal chamber cover 90 must be provided in their usual positions. As seen in Figs. 1 and 10, the block 34 into which the screw 32 is screwed for securing the back plate 31 is provided with a button 91 at the proper position for engaging a keyhole slot in a conventional terminal chamber cover 90. A hexagonal nut welded to a plate having a rivet thereon may be preferable from the manufacturing standpoint. At the other end of the terminal chamber a link 92 is slidably secured above the terminal chamber, being secured as best seen in Fig. 15 by means of a bracket 93 which may be secured to the body portion by a rivet 94. The inner end 96 of the slidable link 92 is passed inwardly (to the left) against a lug on the bottom of the cover 90 after the cover has been turned clockwise to tighten the bayonet clamps. This method of locking the main cover is in accordance with standard practice, except that the method of securing the sliding link 92 is new. When the link 92 is in its inner locking position, the sealing plate 36 (Figs. 1 and 15) extends through a slot 98 in the slidable link 92. The terminal chamber cover 90 may now be closed with the lug 90 on link 92 extending through a slot therein. A conventional sealing wire may be passed through an aperture in the lug 99 with its ends secured in a lead slug to lock both the terminal chamber cover 90 and link 92, the latter locking the main meter cover by engaging a lug on the bottom thereof to prevent turning the cover to release the bayonet clamps. A separate sealing wire may likewise be passed through an aperture in the sealing plate 86 to separately lock the link 92 and through it the main meter cover, if desired.

It should be observed that, as seen best in Fig. 11, the terminal chamber cover 90 has its bottom flange 101 extending under the brackets 76, thus supporting the front ends of these brackets. This effectively prevents prying the brackets downwardly to obtain access to a mounting screw 102. It might be noted that it would be rather impractical to provide porcelain in the place of the brackets 76, since the space limitations and the conventional position for the mounting screws would make the wall too thin to be formed of porcelain with reliability.

The front of the terminal block portion of the body portion 11 is provided with a thin sealing rib 104. It is not necessary to grind this to a plane, however, since a relatively resilient rubber gasket 106 (Fig. 11) may be used. Possible vulcanization of the rubber at this point does not present a serious danger since the terminal chamber cover 90 may easily be pried off even if the rubber should vulcanize.

Sometimes a different means of securing the terminal chamber cover is provided by a particular power supply organization, this means comprising bolts screwed through the cover into the meter base. To accommodate these bolts, tapped holes 107 are provided. According to the present invention, these tapped holes are provided at substantially no extra cost by positioning the screws 32 for the support plate 31 so that the tapped holes into which they screw are in the correct positions to receive the cover-securing bolts. In other words, the screws 32 of course screw only about half way through the blocks 34 and 37 or less, leaving the remainder of the tapped holes 107 for the cover-securing bolts. These bolts are of course suitably sealed, as by a rod extending through the bolts and sealed in this position.

*Additional connections*

For some circuits it is desirable to have one or two extra voltage connections leading into the meter, besides the connections provided through the four main terminal units 56. For this purpose, drilling recesses 110 are provided in the guard plate 73, the position of these being shown in Fig. 7. The inner end of this recess may be drilled out very easily to permit a wire 111 to pass therethrough as shown in dotted lines in Figs. 6 and 12. The porcelain body portion is provided with a passage 112 through which this wire may extend to the voltage connector 69, being held therein by a screw 113 which may be inserted through the face of the terminal block portion of the body member. A like passage is provided at the other end of the terminal chamber portion of the body member. Of course, when a feed wire 111 is used, the disconnect link 66 and its associated screws will be omitted. Likewise, when a wire corresponding to wire 111 is extended through the other drilling recess 110, the disconnect linkage 118 and its associated screws will be omitted.

Besides the facilities for the two potential leads taken through the recesses 111, it is sometimes desirable to provide connections for time control devices in connection with demand meters. For this purpose, three additional drilling recesses 114 are provided in the bottom of the guard plate 73, as seen in Fig. 7. When the inner ends of these recesses are drilled out, they render accessible a passage 116 through which these connecting wires may extend into the meter chamber. A thin wall 117 is preferably provided in manufacture, but it can easily be broken out when the passage is to be used. It may be noted that no insulating wall is required between the two center terminal units 56 between which the passage 116 is provided, because in effect they are both connected in the same service line and the only voltage differential between them is the infinitesimal voltage drop across the current coil of the meter.

*Grounding connection*

According to best wiring practice, the laminations and like metal portions of the metal element should be connected to ground. Otherwise, if a meter tester should happen to be grounded, as by standing on a damp floor, he could get a dangerous shock from the laminations if the insulation happens to have failed between the laminations and one of the coils wrapped around the laminations. With metal meter bases of the past, this grounding of the meter unit has resulted automatically whenever a metal connection box was used for housing the wires leading to the meter. This resulted from the fact that the meter unit was mounted in the metal frame by metal lugs and the metal frame was mounted in contact with the connection box which would be conventionally grounded. Although there are obvious advantages in making the meter base of insulating material in accordance with this invention, this insulating material fails to take care of the automatic grounding of the meter unit. According to the present invention, however, this failure is overcome with complete satisfaction by providing the grounding strap 48, seen best in Figs. 2 and 11. This grounding strap is connected to the laminations of the meter unit by virtue of lying under the head of one of the screws 46 holding one of the bosses or bushings 43 in place. It should be understood that the mounting lug 41 on the meter unit is made of metal and is in direct contact with the laminations.

The grounding strap 48 is connected to ground by being in contact with the mounting plate 31 which will automatically be placed in electrical contact with the connecting box in mounting the meter. The connecting box is represented in Fig. 11 by the member 121 which may be a bracket or extension on the back of a connecting box against which the meter base is clamped by the mounting screw 102.

It should be observed that, as shown at 122 in Fig. 2 and in dotted lines in Fig. 11, the grounding strap 48 may be shaped with its lower end curled up slightly, the curling being exaggerated in the drawings. When the mounting plate 31 is tightened against the grounding strap 48 by screws 32 this curl will be more or less straightened out and the grounding strap placed under stress which presses the upturned end into firm contact with the mounting plate 31. This ensures a good grounding connection. At the present time welding of the ground strap to the mounting plate 31 is preferred to the spring contact shown.

The grounding strap 48 should be made of some weather-resistant material, such as galvanized iron. It may be noted, incidentally, that all of the metal parts are preferably protected from excessive corrosion either by composition or by plating.

Antitampering features

The provision of the guard plate 73 and the manner of securing it has already been described, as has the fact that the securing brackets 76 therefor prevent access to the mounting screws 102. The lip 127 and the blocking plate 129 have also been described. The double wall of the Holmes Patent No. 2,046,307 has not been provided, but porcelain is so difficult to drill that this double wall is not believed to be necessary. Furthermore, the use of a single wall which is sufficiently difficult to drill so that a double wall is not necessary provides more room within the main meter chamber for the meter element or for accessories thereto, and makes possible the provision of a relatively smooth back wall which is easily wiped clean. It may be noted in this connection that if a portion of the meter winding is quite close to the base, there is no danger of spark-overs because the base itself is formed of insulating material.

To minimize the danger that someone will attempt to pry up the cover with a screw driver, the outer wall of the meter base which comes almost into contact with the cover is beveled as seen at 124 in Fig. 14. The cover should come close enough to the inner end of the bevel so that there will not be room for a screw driver to be inserted between it and the cover, and the beveled portion itself will not provide a suitable purchase or fulcrum for prying with the screw driver.

Formation of the body portion

The body portion is of a shape which can be molded in accordance with known molding practices, although it may be advantageous to point out certain special features. No attempt has been made to illustrate a taper or draft for facilitating removal of the molds or cores, but this may be provided wherever desired.

Molding the slots for the terminal straps 57 may present a special problem since a core approximately the shape of these straps might be flexed under the molding pressures. To overcome this danger, these cores may be thickened through most of their length, thus forming the cavity 126, seen for example in Fig. 13. The lip 127 at the upper end of this cavity should be left so as to minimize the possibility of insertion of wires into the meter chamber by meter tamperers. Of course, if desired, the upper end of terminal clamp 58 can also be obstructed by applying a plate 129 thereto as the connecting unit 56 is inserted into the body portion. Although this plate has been shown as formed of insulation, it could be formed of metal and, incidentally, could be formed as an integral part of the terminal strap 57 or terminal clamp 58.

Assembly

For the most part the assembly is apparent from the foregoing description. Of course, the inserts 83 for securing the main cover will probably be applied first, as described in connection with Fig. 5. With the illustrated form it will probably be desirable next to apply the members to which the meter element is mounted. In applying plate 21, the plate 22 will of course be applied. While applying one of the bushings 43, the grounding strap 48 will be applied. Next, the four nuts 62 will be inserted, after which the four terminal units 56 will be slipped up into place from the bottom of the body portion, and the screws 59 inserted through the front to hold them in place. At this time the voltage terminal units 69, 71 will also be inserted from the bottom, and whichever screws will be used therewith inserted from the front. The guard plate 73 may now be applied, after which the mounting plate 31 will be put in place and drawn tight by screws 32. The sliding link 92 may be applied by riveting the bracket 93 to the body portion at any time.

In case the grounding strap is welded to mounting plate 31 the bushings 43 will probably be applied last.

From the foregoing it is seen that a combined meter base and terminal block is provided which is completely non-conductive except where metal parts are desired, which is so completely immune to corrosion or other changes upon exposure to even the most corrosive atmospheres that it does not need to be painted, and which is almost drill-proof and tamper-proof. Furthermore, it conforms with existing bases in all respects in which standardization is desirable, particularly as to the covers and meter units which fit it. It provides more space within the meter chamber than any previous base which was as hard to drill into. Although it is not as light as an aluminum base, it is considerably lighter than a cast iron base. In spite of these advantages, it is economical in cost and may even prove to be capable of manufacture at a lower cost than any previous high quality base and terminal block assemblies.

I claim:

1. A base for watt-hour meters and the like, comprising an insulating body portion formed of a ceramic, having slots extending inwardly from the outside thereof, terminal units positioned in said slots and secured therein by binding screws, said body portion having integral ceramic walls insulating some of said terminal units one from another, and a guard plate, of a plastic less brittle than the ceramic, outside of the terminal units and slightly spaced therefrom by an air gap to prevent tracking between the terminal units along the guard plate if the guard plate is trackable.

2. A base for watt-hour meters and the like, comprising an insulating body portion formed of a fired ceramic, having a narrow sealing rib for engaging a cover, having recesses adjacent the sealing rib, and having irregularly shaped metallic inserts cemented in the recesses, each insert having a lug extending therefrom in a direction to engage a bayonet clamp to secure the cover to the base, the recesses being oversize with respect to the inserts and the inserts being accurately positioned with respect to each other and the sealing rib independently of shrinkage or warping in firing the base.

3. A base for watt-hour meters and the like, comprising an insulating body portion formed of a fired ceramic, having a narrow sealing rib for engaging a cover, having recesses adjacent the sealing rib, and having metallic inserts cemented in the recesses, each insert having a lug extending therefrom in a direction to engage a bayonet clamp to secure the cover to the base, the recesses being oversize with respect to the inserts and the inserts being accurately positioned with respect to each other and the sealing rib independently of shrinkage or warping in firing the base.

4. A base for watt-hour meters and the like, comprising an insulating body portion formed of a plastic, having slots extending inwardly from the outside thereof, and terminal units positioned in and substantially filling said slots and secured therein by binding screws and some of which are positioned in closely spaced side by side relationship but are insulated from one another by a wall of the plastic integral with the body portion.

5. A base for watt-hour meters and the like, comprising an insulating body portion formed of a ceramic, having slots extending inwardly from the outside thereof, and terminal units positioned in said slots and secured therein by binding screws, said body portion having integral ceramic walls insulating some of said terminal units one from another and an integral front wall through which the terminal screws pass but which shield said units from the front.

6. A base for watt-hour meters and the like, comprising an insulating body portion formed of a plastic, having passage means extending inwardly from the outside thereof, terminal units secured in said passage means positioned within the ends of the passage means and surrounded by the body except for their end faces, and an insulating guard plate mounted outside of the terminal units.

7. A base for watt-hour meters and the like, comprising an insulating body portion formed of a plastic, having passage means extending inwardly from the outside thereof, terminal units secured in said passage means, and an insulating guard plate mounted outside of the terminal units, said insulating guard plate having conductor-receiving openings therethrough, the edges of which are spaced slightly outwardly from alinement with the conductor-engaging portions of the terminal units whereby conductors passing through the guard plate are unlikely to contact the guard plate.

8. A base for watt-hour meters and the like, having terminal units positioned therein and extending inwardly from an outer wall thereof, and an insulating guard plate mounted outside the terminal units, said insulating guard plate having conductor-receiving openings therethrough, the edges of which are spaced away slightly from alinement with the conductor-engaging portions of the terminal units whereby conductors passing through the guard plate are unlikely to contact the guard plate.

9. A base for watt-hour meters and the like, comprising an insulating body portion formed of a plastic, having a metal mounting plate secured to the back portion of the body portion, a guard member of insulation secured on the outside of the base by said mounting plate, and terminal units within the base protected by said guard member.

10. A base for watt-hour meters and the like, comprising a body portion formed of insulating material forming a measuring unit chamber and a terminal portion, a metallic insert for mounting the measuring unit in the measuring unit chamber, an insulating guard plate positioned outside of the terminal portion, and metallic means including a mounting plate secured to the body portion for mounting the base to a wall, said mounting plate securing said guard plate in position and being positioned to engage a conventional connecting box for wires leading to the measuring unit, and said metallic means including said mounting plate being in contact with the metallic insert for grounding the measuring unit.

11. The method of making a base for watt-hour meters and the like, which consists in providing a preformed body portion of insulating material, having a sealing surface lying approximately in a plane and adapted for the sealing of a cover thereagainst, and having a plurality of pockets adjacent said surface but variably positioned with respect thereto because of the forming process, temporarily securing three widely spaced lugged metallic inserts in said pockets with the lugs thereon adapted to engage bayonet cover clamps and positioned accurately with respect to said plane and in relation to one another but independently of their positions in said pockets, and permanently securing said inserts to said base while thus temporarily secured by putting cement in said pockets around said inserts.

12. A base for watt-hour meters and the like comprising a ceramic body portion forming, in part at least, a terminal chamber and a meter chamber and having slots extending inwardly through the terminal chamber and into the meter chamber from the outside of the body, terminal units positioned in said slots, secured therein by binding screws and having a terminal strap portion extending into the meter chamber through a connecting portion of the slot, the connecting portion of the slot having such dimensions that its cross section is substantially filled by the terminal strap, said body portion having integral ceramic walls insulating some of said terminal units, one from another, and a guard plate formed of a plastic less brittle than the ceramic but of trackable characteristics secured outside of the terminal units, substantially covering the ends thereof exposed at the ends of the slots but slightly spaced therefrom by an air gap to prevent tracking between the terminal units along the guard plate, said guard plates having holes through which conductors pass to the terminal units, the walls of said holes being slightly spaced away from the position which would contact a straight conductor clamped in the terminal units whereby the danger of tracking across the guard plate between conductors is minimized.

13. A meter base for watt-hour meters and the like comprising a ceramic body portion which has been fired, and means for mounting a meter mechanism therein comprising three independent members each adapted to receive a mounting screw for the mechanism, and each independently secured in a hole by means passing through the body of the base whereby a plane is defined, even if there is warpage in the base for receiving the measuring element with three-point mounting, at least two of the holes being oversize with respect to the means therein whereby the members may be spaced accurately with respect to one another irrespective of slight dimensional variations in the body portion, the front side of the body portion being free from obstructions along central areas thereof to provide the maximum depth for receiving the measuring element.

RICHARD A. ROAD.